Patented June 18, 1929.

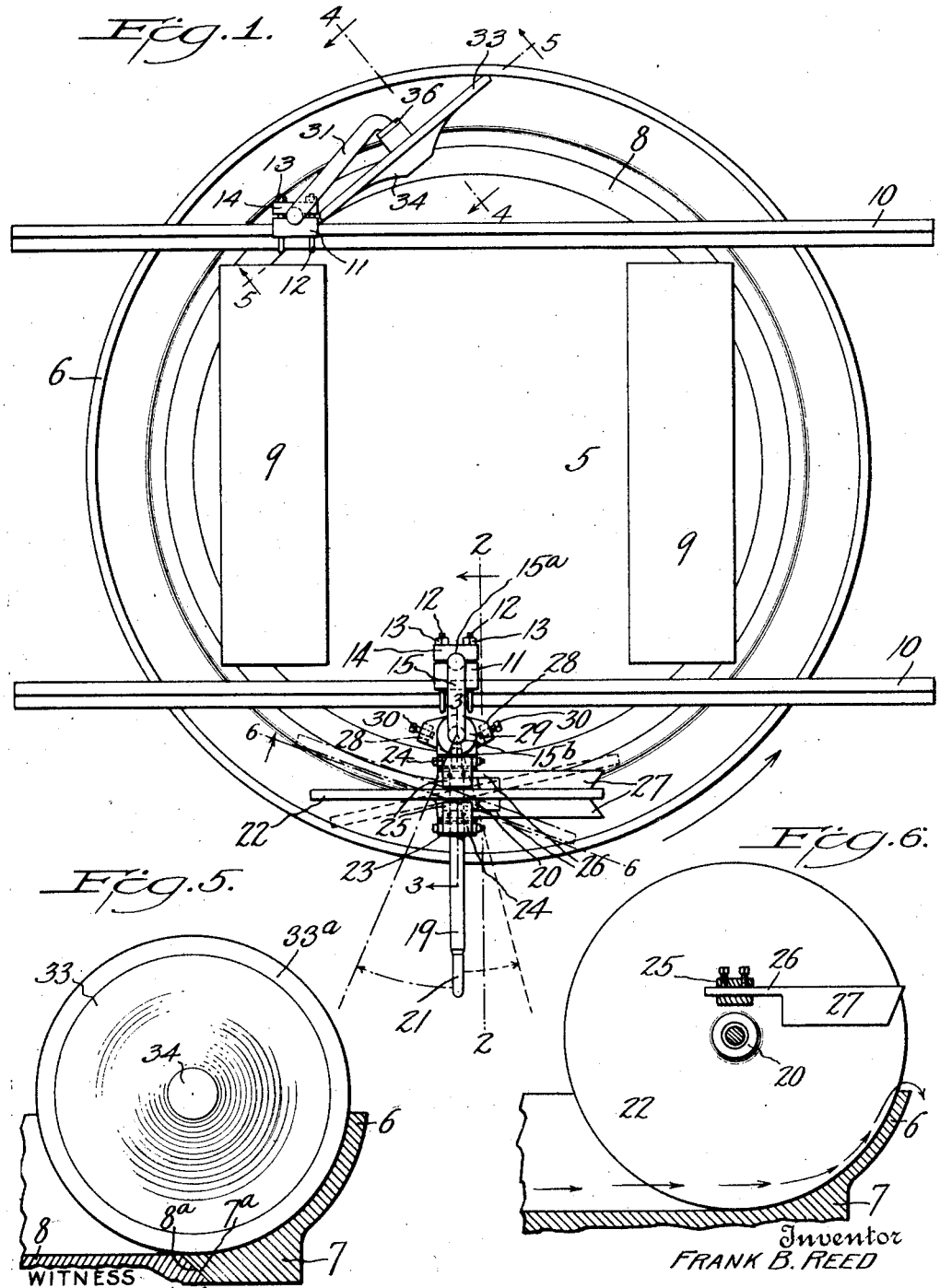

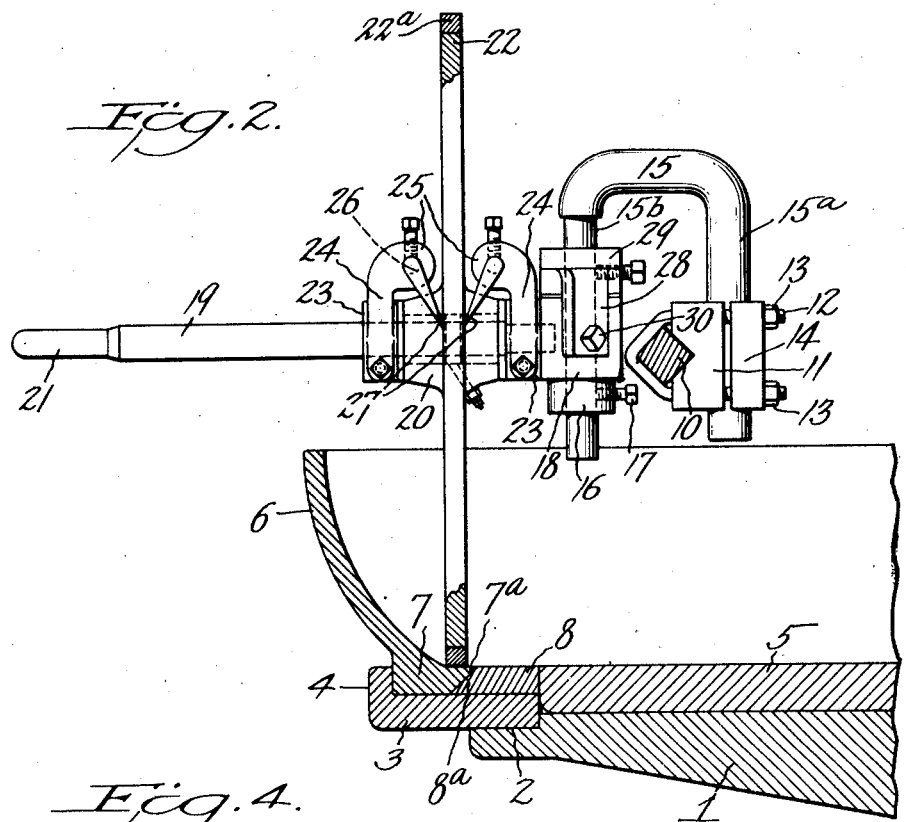
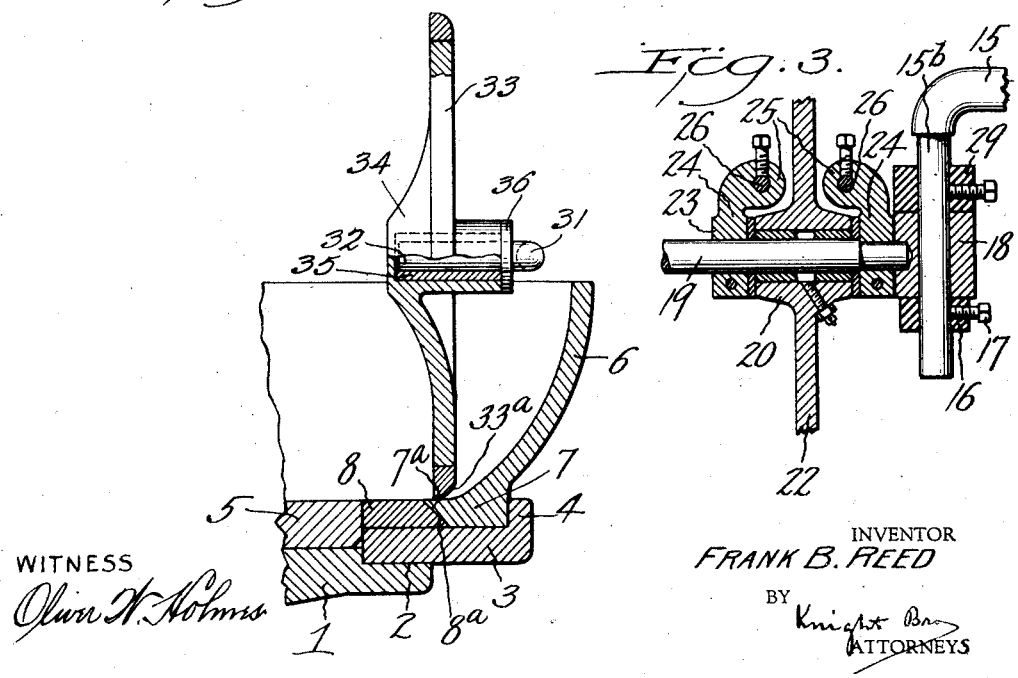

1,718,004

UNITED STATES PATENT OFFICE.

FRANK B. REED, OF CLEARFIELD, PENNSYLVANIA, ASSIGNOR TO CLEARFIELD MACHINE COMPANY, OF CLEARFIELD, PENNSYLVANIA, A CORPORATION OF PENNSYLVANIA.

GRINDING OR MIXING MILL.

Application filed March 17, 1928. Serial No. 262,358.

This invention relates more especially to that type of grinding or mixing mills in which muller rolls operate in and, in some instances, are rotated by running contact with the material containing pans.

The primary object of my invention is to provide an improved construction and arrangement of parts in a machine of this character for the purpose of increasing the effectiveness of the machine in operation.

One of the objects of my invention is to provide an improved construction wherein those parts which are peculiarly subject to wear and tear may be readily repaired or replaced.

Another object of this invention is to provide an improved construction and arrangement of the parts whereby the pan-scraping and pan-emptying disks in a machine of this character may be cooperatively controlled to better advantage.

Another object of this invention is to provide an improved construction for grinding or mixing pans whereby their rims may be readily removed and replaced and an improved formation of said rims with respect to the size, shape, and location of the emptier and scraper disks employed therewith.

Another object of invention is to provide emptier and scraper disks of improved form and construction whereby said disks are better adapted to cooperate with the muller rolls and whereby the proper size and conformation of said disks with respect to the rim of the pan, may be maintained while at the same time prolonging the life of the disks themselves.

Other and further objects of my invention will appear in the specification in connection with the accompanying drawings which show a preferred embodiment of the invention.

In the drawings

Figure 1 is a top plan view of those portions of a mixing or grinding mill to which my invention more immediately relates.

Figure 2 is an enlarged vertical section corresponding to the line 2—2, of Figure 1, parts being broken away and parts shown in elevation.

Figure 3 is an enlarged detail section corresponding to the line 3—3, of Figure 1, parts being shown in elevation.

Figure 4 is an enlarged vertical section corresponding to the broken line 4—4, of Figure 1, parts being broken away and parts shown in elevation.

Figure 5 is an enlarged section on the line 5—5, Figure 1.

Figure 6 is an enlarged section on the line 6—6, of Figure 1.

Grinding pan.

According to the embodiment of my invention shown on the drawings, the rotary pan of the grinding or mixing mill includes a table or support 1 provided around its outer periphery with an annular recess 2. Seated in the annular recess 2, is a rim-supporting ring or plate 3 provided with an upwardly-presented flange 4. Concentrically arranged with respect to the table or support 1 is a center plate or disk 5, the outer peripheral edge thereof being flush with the cylindrical wall of annular recess 2, the inner peripheral edge of the rim-supporting plate 3 being arranged in abutment with the outer edge of center plate 5 and cylindrical shoulder formed in table 1 by the recess 2. Mounted upon the rim-supporting plate 3 is a removable rim 6, said rim being provided with a base portion 7 seated upon the plate or ring 3 and having its outer periphery in abutment with the upwardly-presented flange 4. Said base portion 7 of the demountable rim 6 is provided with an undercut inner periphery 7ª. Interposed between the outer periphery of center plate 5 and the inner periphery of the base portion 7 of rim 6, is a false ring or annular plate 8, which is adapted to interlock with the base portion 7 of rim 6 by means of an outwardly-beveled lower corner 8ª which fits in and under the inner periphery 7ª of said base portion 7. By means of this construction, it becomes possible to secure the false ring plate 8 in place without the use of bolts and hence avoids the common practice of forming holes in said plates and thus weakening them.

Muller rolls.

The muller rolls 9, 9, are represented diagrammatically in Figure 1, said rolls, according to the present embodiment of my invention, being adapted to be driven by means of their running engagement with the grinding or mixing pan.

Combined scraper and emptier disk.

According to the preferred embodiment of my invention, this device is constructed as follows. Arranged parallel to the common rotary axis of rolls 9, 9, and on opposite sides of said rotary axis, are fixed supports or bars 10, 10, which may be made with rectangular cross-sections as shown in Figures 2 and 4. Slidably adjustable along one of said bars, is a block 11 provided with a V-shaped notch adapting it to slidably engage one corner of the bar 10. Extending around the bar 10 and through suitable holes in the block 11, are spaced yoke bolts 12, 12, the outer ends of said yoke bolts being secured by nuts 13, 13, on the outer face of a second block 14. Said blocks 11 and 14 together form a clamp which grips one branch 15$^a$ of an inverted U-shaped connection 15, the other branch 15$^b$ thereof carrying a collar 16 which is secured thereto by means of a set screw 17. A cylindrical block 18 which is supported by the collar 16 is oscillatably connected to the said branch 15$^b$ of the U-shaped connection 15. Rigidly mounted at one end in the cylindrical block 18, is a lever arm 19 which is provided at its outer end with a hand-grip 21 by means of which said lever arm may be oscillated in a horizontal plane. Journaled upon the inner end of said lever arm and thus upon a horizontally movable axis, is the hub portion 20 of a combined scraper and emptier disk 22, said disk being axially confined between the hub portions 23, 23, of two knife-supporting bracket arms 24, 24, which are provided with bearing lugs 25, 25, for receiving the shanks 26, 26, of knives 27, 27, which extend radially along opposite faces of disk 22. Suitable means for limiting the angular throw of lever arm 19 in either direction, may be provided by means of stop-lugs 28, 28, which depend from an upper collar 29 on the branch 15$^b$ of the U-shaped connection 15. In each of said stop-lugs 28, 28, is arranged a set-screw 30 which may be adjusted to correspond to any desired angular setting of the disk 22. It will be understood therefore, that the angular disposition of the rotary disk 22 may be predetermined for the purpose of securing proper contact relations between said disk and the inner surface of the rim of said pan. Variations in these adjustments may be made by means of the sliding block support 11 which may be moved along the fixed horizontal bar support 10 for this purpose.

Scraper disk.

As shown in Figure 4, the scraper disk mount provides a combined angular and straight line adjustment of the scraper disk in a manner substantially similar to that described above for the combined scraper and emptier disk. Thus the rectangular guide bar 10 carries a slide block 11 which is retained in position by yoke-bolts 12, 12, said bolts passing through holes in block 11 and a keeper block 14 and having nuts 13, 13, threaded to the outer ends thereof. This adjustable clamp is adapted to receive the downwardly-presented end of a bent bracket-arm 31, said bracket-arm being provided with a laterally-presented outer end 32 upon which is journalled a scraper disk 33. Said scraper disk is provided with a swelling 34 extending around the inner closed end of the hub of said scraper disk. This swelling is presented toward the approaching stream of material and operates to overturn the material just before it passes under the muller roll. In this way a better mixture of the mass is secured.

In order to more effectively maintain a close fitting contact between the peripheries of disks 22 and 33 and the inner wall of rim 6, said disks are provided with replaceable peripheral bands 22$^a$ and 33$^a$ respectively whereby said disks may be maintained substantially constant in diameter and their usefulness thus prolonged. As shown in Figure 4, the scraper disk 33 may have its outer peripheral corner rounded to insure smoother running contact between it and the inner wall of the grinding pan. By means of this construction, the wear and tear on the inner surface of rim 6 is more uniformly distributed. It will be understood from this description that as soon as either of said disks begins to show an undesirable amount of wear, the replaceable peripheral band 22$^a$ or 33$^a$ may be replaced by a new band which again restores the disk to full size.

By an inspection of Figure 2, it will be seen that the demountable rim 6 rests upon the outside false ring 3 and overlaps the outer periphery of the false ring plate 8. The flared curved form of this demountable rim 6 is designed with reference to the size, shape and location of the emptier and scraper disks 22 and 33. Thus, the rim 6 is so shaped that the scraper and emptier disk 22 when swung to and fro in a horizontal plane, will make a proper contact with said rim in both of its extreme positions. At the same time, the scraper disk 33 of smaller size is arranged at a different angle and thus provided with proper contact with rim 6. The diameter of the combined scraper and emptier disk 22 is made considerably more than twice the height of the rim 6 above the top surface of the false ring plate 8 while the diameter of scraper disk 33 is made only slightly larger than double the height of rim 6. As the pan rotates in the direction indicated by an arrow in Figure 1, the disk 22 is retained in its extreme counter-clockwise position and operates as a scraper for directing the material to roll 9. This position corresponds to the continuously maintained position of scraper disk 33 which, while conforming to rim 6, is arranged to deflect the material to the outer edge of the other roll 9 which impels said material in a continuous stream which may be emptied from the pan at times when the emptier disk 22 is forcibly moved to its extreme clockwise position by means of the handle or stud 19 which is provided for this purpose. If and when desired, the scraper disk 33, operating always in the position shown in Figure 1, may be replaced by a combined scraper and emptier disk 22 and adapted to operate alternately as a scraper and emptier disk in the manner described in connection with emptier disk 22. The preferred form of scraper disk 33 is shown best in Figure 4, as described above and when desired, the scraper and emptier disk 22 may be similarly formed.

I claim:—

1. The combination with a rotary pan having an upwardly flared rim provided with an inner wall forming a surface of revolution around the rotary axis of said pan, of a scraper disk rotatable on a horizontal axis in said pan and having its peripheral edge contacting with the inner wall of said pan along a circular arc lying within said surface of revolution.

2. The combination with a rotary pan provided with an upwardly-flared rim and muller rolls operating therein, of a combined scraper and emptier disk operating in said rotary pan, and a journalling support for said combined scraper and emptier disk, said journalling support being movable in a horizontal plane to adapt said combined scraper and emptier disk to assume different angular positions with respect to the inner surface of said rotary grinding pan for operating alternatively as a scraper or emptier disk.

3. A rotary pan provided with an upwardly flared rim of curved cross-section, a muller roll operating in a vertical plane parallel to the axis of said rotary pan, a scraper disk operating in a plane intersecting the first-mentioned plane and having a peripheral edge corresponding to the intersection of the second-mentioned plane with the inner surface of said rim, and an emptier disk normally operating in a plane intersecting the inner wall of said rim in a curve conforming to the outer periphery of said emptier disk and movable into a second plane of operation which intersects the inner wall of said rim in a curve conforming to the periphery of said emptier disk, said operating planes of the emptier disk being divergent from the inner wall of said rim in directions respectively presented away from and towards said muller roll.

4. The combination with a mixing and grinding pan rotatable on a vertical axis, of muller rolls running therein, a fixed support extending across and above the upper edge of said grinding pan, an inverted U-shaped connection, one branch of said U-shaped connection being adjustably secured to said fixed support, a sleeve support adjustably secured to the other branch of said U-shaped connection, a disk-supporting arm presented radially from said sleeve support, a disk journalled on said disk-supporting arm, and axially-spaced collars secured to said disk-supporting arm on opposite sides of said disk.

5. A rotary pan for mixing and grinding mills, comprising a rotary table or support, an annular rim-supporting plate mounted upon and concentrically arranged with respect to said rotary table or support, a demountable rim concentrically arranged with respect to said rotary table or support and mounted thereon by means of said rim-supporting plate, and a replaceable false ring mounted on said rim-supporting plate within said rim, said rim and false ring having interlocking portions for holding the latter against lateral or upward displacement.

6. A rotary pan for mixing and grinding mills, said rotary pan comprising a rotary table or support, an annular rim-supporting plate carried by said rotary table or support, a rim provided with a base portion seated upon said annular rim-supporting plate, said base-portion of the rim being provided with an undercut inner periphery, an annular plate or false ring having its outer periphery interlocking with the undercut inner periphery of said base-portion of the rim and a center plate mounted within said annular plate or false ring.

7. A rotary pan for mixing and grinding mills comprising a rotary table or support, an annular rim-supporting plate seated thereon, said rim-supporting plate being provided with an upwardly-presented flange extending around the outer periphery thereof, a rim provided with a base portion seated upon said annular rim-supporting plate and having its outer periphery in abutment with said upwardly-presented flange, an annular plate or false ring having its outer periphery in interlocking engagement with the inner periphery of said base-portion of the rim, and a center grinding disk mounted on said rotary table or support and having an outer periphery in abutment with the inner periphery of said false ring.

8. A rotary pan for mixing and grinding mills, said rotary pan comprising a rotary table or support provided with a peripheral recess, an annular rim-supporting plate seated within said peripheral recess, said rim-supporting plate being provided with an upwardly-presented flange extending around the outer periphery thereof, a demountable rim provided with a base portion seated upon said annular rim-supporting plate and having its outer periphery in abutment with said upwardly-presented flange, said base-portion of the rim being provided with an undercut inner periphery forming an angular recess with the upper surface of said rim-supporting plate, an annular plate having its outer periphery beveled and interlocking with the undercut inner periphery of said base-portion of the rim, the inner periphery of said annular plate being in register with the inner periphery of said annular rim-supporting plate, and a center grinding disk mounted on said rotary table or support and having an outer periphery in abutment with the inner peripheries of said rim-supporting plate and false ring.

9. The combination with a mixing and grinding pan rotatable on a vertical axis, of muller rolls running therein, a fixed support extending across and above the upper edge of said grinding pan, an inverted U-shaped connection carried by said fixed support, one branch of said U-shaped connection being connected to said horizontal support, a sleeve mounted on the other branch of said U-shaped connection, a disk-supporting arm presented radially from said sleeve, and a disk journalled on said disk-supporting arm.

10. In a mixing and grinding pan, the combination with a rotary mixing and grinding pan, provided with an upwardly-flared rim and a muller roll operating in said mixing and grinding pan, a bar support extending across and above the upper edge of said upwardly-flared rim, a clamp-support adjustable along said bar-support, a disk-supporting arm pivotally mounted in said clamp-support, and a disk journalled in said disk-supporting arm and adapted by its pivotal mount in the former to be moved alternately into positions to operate as scraper disk and pan-emptying disk respectively in connection with the inner wall of said upwardly-flared rim.

11. The combination with a rotary pan having an upwardly-flared rim and a roll operating in said rotary pan, of a rotary disk operating in one angular relation to said rim as a scraper disk for directing material into the path of said roll and in another angular relation thereto for operating as an emptier disk, and means for adjusting said rotary disk from one to the other of said angular relations.

12. The combination with a rotary pan having an upwardly-flared rim provided with an inner wall forming a surface of revolution around the rotary axis of said pan and a muller roll operating in said rotary pan, of a rotary disk operatable in said pan in two different positions and having its peripheral edge in each of said positions contacting with the inner wall of said pan along a circular arc lying within said surface of revolution, said rotary disk being thereby adapted to operate as a scraper disk and as an emptier disk in said positions respectively.

13. The combination with a rotary mixing and grinding pan provided with an upwardly-flared rim and with muller rolls operating therein, of a rotary disk journalled upon a horizontal axis and operating in said mixing and grinding pan, the rotary axis of said disk being movable to and fro in a horizontal plane between positions in which said rotary disk is presented in successive positions with respect to said upwardly-flared rim to operate as a scraper and emptier disk respectively.

14. The combination with a rotary pan provided with an upwardly-flared rim and with muller rolls operating therein, of a rotary disk rotatable in a horizontal axis within said rotary pan, and a journalling support for said rotary disk movable in a horizontal plane between positions in which said rotary disk is adapted to have running contact with said upwardly-flared rim as a scraper and emptier disk respectively.

15. The combination with a rotary pan provided with an upwardly flared curved rim, of a muller roll operating therein, a scraper disk rotating on a horizontal axis and adjustable in a horizontal plane within said rotary pan, said scraper disk having an outer periphery conforming to the rim of said grinding pan.

16. The combination with a mixing and grinding pan provided with an upwardly-flared rim and having muller rolls running therein, of a rigid support arranged above and extending across the upper edge of said grinding pan, a lever arm presented away from said rigid support, a disk journalled on said lever arm, and means adjustable along said rigid support for pivotally mounting said lever arm and for adjusting the position of said disk with respect to the inner wall of said upwardly-flared rim.

17. In a rotary mill of the character described, the combination of a rotary pan having a replaceable rim provided with an inner wall conforming to a surface of revolution concentric with the rotary axis of said pan, of a rotary disk operating in said rotary pan and having a peripheral edge contacting with and conforming to said surface of revolution.

18. In a rotary mill of the character described, the combination of a rotary pan having a replaceable rim provided with an inner wall conforming to a surface of revolution concentric with the rotary axis of said pan, of a rotary disk operating in said rotary pan and having a peripheral edge contacting with and conforming to said surface of revolution in a plane parallel to and distant from the rotary axis of said pan.

19. In a rotary mill of the character described, the combination of a rotary pan having a rim provided with an inner wall conforming to a surface of revolution about the rotary axis of said pan, and a rotary disk provided with a replaceable rim, said rotary disk being arranged to operate in said pan with the replaceable rim of said disk in sliding engagement with said surface of revolution from top to bottom of said rim.

20. In a rotary mill of the character described, the combination of a rotary pan having a replaceable rim provided with an inner wall conforming to a surface of revolution, of a rotary disk operating in said rotary pan, said rotary disk being provided with a replaceable rim contacting with the inner wall of said rim in a line lying entirely within the surface of revolution of said inner wall of the replaceable rim.

21. In a rotary mill of the character described, the combination with a rotary pan comprising a center plate, a replaceable rim provided with a base-portion spaced outwardly from the outer edge of said center plate, and a false ring plate interposed between said center plate and the base portion of said replaceable rim.

FRANK B. REED.